United States Patent
Filev et al.

(10) Patent No.: US 9,367,524 B1
(45) Date of Patent: Jun. 14, 2016

(54) SYSTEMS AND METHODS FOR SELECTING WEB PAGE LAYOUTS INCLUDING CONTENT SLOTS FOR DISPLAYING CONTENT ITEMS BASED ON PREDICTED CLICK LIKELIHOOD

(75) Inventors: Momchil Filev, Mountain View, CA (US); Johnny Chen, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 858 days.

(21) Appl. No.: 13/490,128

(22) Filed: Jun. 6, 2012

(51) Int. Cl.
*G06F 17/21* (2006.01)
*G06Q 30/02* (2012.01)
*G06F 17/22* (2006.01)

(52) U.S. Cl.
CPC .......... *G06F 17/212* (2013.01); *G06F 17/2247* (2013.01); *G06Q 30/0241* (2013.01); *G06Q 30/0276* (2013.01); *G06Q 30/0277* (2013.01)

(58) Field of Classification Search
CPC ............. G06F 17/212; G06Q 30/0241; G06Q 30/0276; G06Q 30/0277
USPC ........... 705/14.4, 14.72, 14.73; 715/243, 246, 715/253
See application file for complete search history.

(56) References Cited

U.S. PATENT DOCUMENTS

| | | | | |
|---|---|---|---|---|
| 6,714,975 B1* | 3/2004 | Aggarwal | ............... | G06Q 30/02 705/14.43 |
| 7,401,289 B2 | 7/2008 | Lachhwani et al. | | |
| 7,809,705 B2 | 10/2010 | Dom et al. | | |
| 7,877,677 B2 | 1/2011 | Wyler et al. | | |
| 7,899,803 B2 | 3/2011 | Cotter et al. | | |
| 8,195,508 B1* | 6/2012 | Calder | ............... | G06Q 30/0207 705/14.1 |
| 8,271,328 B1* | 9/2012 | Baltz | ....................... | G06Q 30/02 705/14.4 |
| 8,407,094 B1* | 3/2013 | Axe | .................... | G06Q 30/0251 705/14.73 |
| 2002/0007378 A1* | 1/2002 | Tanaka | .................... | G06Q 30/02 715/234 |
| 2002/0026352 A1* | 2/2002 | Murata | .................. | G06Q 30/02 705/14.46 |
| 2002/0046099 A1* | 4/2002 | Frengut | .................. | G06Q 30/02 705/14.52 |
| 2002/0097235 A1* | 7/2002 | Rosenberg et al. | ........... | 345/204 |
| 2002/0186241 A1* | 12/2002 | Kohda | .............. | G06F 17/30011 715/744 |
| 2006/0069618 A1* | 3/2006 | Milener et al. | .................. | 705/14 |
| 2006/0107204 A1* | 5/2006 | Epstein | ......................... | 715/517 |
| 2006/0143568 A1* | 6/2006 | Milener et al. | ................. | 715/738 |
| 2007/0130176 A1* | 6/2007 | Kawabe | ................ | G06F 17/248 |
| 2008/0201220 A1* | 8/2008 | Broder | ................... | G06Q 30/02 705/14.56 |

(Continued)

OTHER PUBLICATIONS

Ron Kohavi; Roger Longbotham; Dan Sommerfield; Randal M. Henne, Controlled experiments on the web: survey and practical guide; Jul. 30, 2008, Springer Science+Business Media, Data Min Knowl Disc (2009) 18:140-181, <DOI: 10.1007/s10618-008-0114-1>, <URL: http://link.springer.com/article/10.1007%02Fs10618-008-0114-1>.*

*Primary Examiner* — Cesar Paula
*Assistant Examiner* — Yahao Chen
(74) *Attorney, Agent, or Firm* — Foley & Lardner LLP; John D. Lanza

(57) ABSTRACT

Apparatus and method for dynamic web page layout optimization. In accordance with some embodiments, a plurality of different layouts are defined for a web page of a publisher. Each of the different layouts have at least one common element and at least one content slot adapted to display a content item. A request for the web page is received from a network accessible device having associated profile information, and a selected layout is identified using the profile information. At least one content item is selected for display in each content slot of the selected layout. Data are thereafter transferred to the network accessible device to display the web page arranged in accordance with the selected layout along with the selected content item.

14 Claims, 6 Drawing Sheets

(56) References Cited

U.S. PATENT DOCUMENTS

| | | | |
|---|---|---|---|
| 2008/0262913 A1* | 10/2008 | Reitz et al. | 705/14 |
| 2009/0063249 A1* | 3/2009 | Tomlin | G06Q 30/02 705/7.34 |
| 2009/0106096 A1* | 4/2009 | Horowitz | G06Q 30/0226 705/14.27 |
| 2009/0157609 A1 | 6/2009 | Phan et al. | |
| 2009/0240677 A1* | 9/2009 | Parekh | G06F 17/30867 |
| 2009/0265611 A1 | 10/2009 | Sengamedu et al. | |
| 2010/0017704 A1 | 1/2010 | Jaffe et al. | |
| 2010/0030647 A1 | 2/2010 | Shahshahani | |
| 2010/0083163 A1* | 4/2010 | Maghoul et al. | 715/781 |
| 2010/0223578 A1* | 9/2010 | Huberman et al. | 715/810 |
| 2011/0022464 A1* | 1/2011 | Dunn | G06Q 30/02 705/14.52 |
| 2011/0040617 A1* | 2/2011 | Moonka | G06Q 30/02 705/14.46 |
| 2011/0047026 A1* | 2/2011 | Biggs et al. | 705/14.46 |
| 2011/0054960 A1* | 3/2011 | Bhatia et al. | 705/7 |
| 2011/0125577 A1 | 5/2011 | Son et al. | |
| 2011/0264509 A1* | 10/2011 | McElfresh et al. | 705/14.42 |
| 2012/0066053 A1* | 3/2012 | Agarwal | 705/14.41 |
| 2012/0072279 A1* | 3/2012 | Agarwal | G06F 17/30445 705/14.43 |
| 2012/0159314 A1* | 6/2012 | Schrier et al. | 715/252 |
| 2013/0018697 A1* | 1/2013 | Giuffrida | G06Q 30/02 705/7.29 |
| 2013/0024757 A1* | 1/2013 | Doll | G06Q 50/01 715/204 |
| 2013/0031470 A1* | 1/2013 | Daly et al. | 715/243 |
| 2013/0054348 A1* | 2/2013 | Holsman et al. | 705/14.43 |
| 2013/0167044 A1* | 6/2013 | Graves | H04M 3/5191 715/756 |
| 2013/0211925 A1* | 8/2013 | Holland | G06Q 30/0241 705/14.72 |
| 2013/0325585 A1* | 12/2013 | Amit et al. | 705/14.41 |

* cited by examiner

SYSTEMS AND METHODS FOR SELECTING WEB PAGE LAYOUTS INCLUDING CONTENT SLOTS FOR DISPLAYING CONTENT ITEMS BASED ON PREDICTED CLICK LIKELIHOOD

BACKGROUND

Content providers generally operate to provide content for display on web pages of Internet websites. The content may take a variety of forms, and may be updated on a regular basis to attract and retain user visits to the site.

While operative, there remains a continual need for improvements whereby user enjoyment of a particular web page, and in at least some cases, opportunity for revenue for the proprietor of a website, may be enhanced.

SUMMARY

Various embodiments disclosed herein are generally directed to dynamic web page layout optimization.

In accordance with some embodiments, a plurality of different layouts are defined for a web page of a publisher. Each of the different layouts have at least one common element and at least one content slot adapted to display a content item. A request for the web page is received from a network accessible device having associated profile information, and a selected layout is identified using the profile information. At least one content item is selected for display in each content slot of the selected layout. Data are thereafter transferred to the network accessible device to display the web page arranged in accordance with the selected layout along with the selected content item.

These and other features and advantages which may characterize various embodiments can be understood in view of the following detailed discussion and the accompanying drawings.

DETAILED DESCRIPTION

Figure 1:
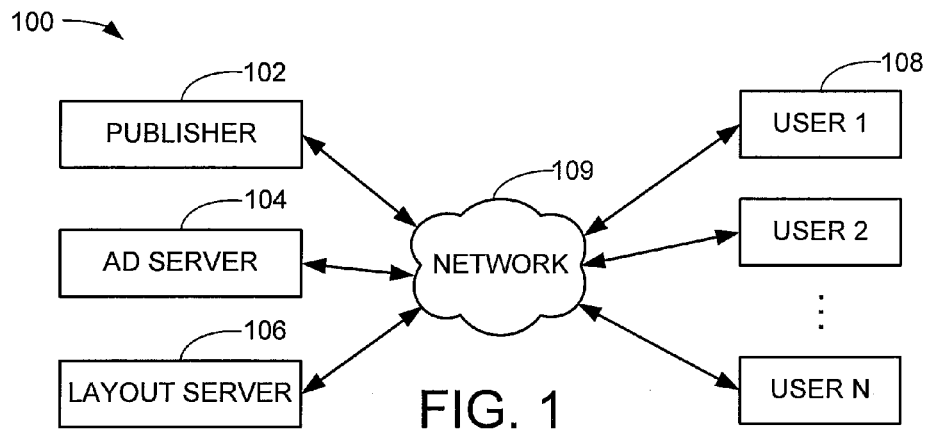
FIG. 1 provides a functional block representation of a network-based system in accordance with various embodiments.

The present disclosure generally relates to the display of data on a user device and, more particularly, to the selection of a web page layout responsive to profile information associated with the device.

It is becoming increasingly common to display different types of content within the context of an Internet web page. The content may take a variety of forms, and be supplied from a variety of different content providers. One form of content may be in the form of advertisements (ads) that are displayed within the context of an Internet web page. Configuration of a web page display of such items may lead to increased revenue opportunities for the proprietor (publisher) of the web page.

Some content includes a creative portion which may involve text, graphics, images or video files associated with an advertised service, product, or other invitation to action by the user. The content may further include an interactive portion such that user selection (a "click") of the advertisement will direct the user to additional information related to the advertisement. The interactive portion of an ad can take a variety of forms. For example, advertisements can be configured such that, upon selection, the user is connected to a linked web page with additional information, often referred to as a "landing page." Some content may have forms or fields to "pre-load" searches or other operations on the landing page associated with the ad.

Other content may have a "click to call" feature that enables a user to call (establish a telephonic connection with) the advertiser directly from the ad via clicking on a virtual button. Still other advertisements may have a "click to chat" feature that opens a chat window directly from a virtual link or button on the advertisement creative to enable the user to chat with a representative associated with the ad.

A "click to buy" (or "click to purchase") feature allows users to carry out a purchase transaction for an advertised product or service. Similarly, a "click to download" feature can initiate a transaction that takes the user to an application store to purchase an advertised application (app).

Not all advertising content is necessarily directed to the purchase of goods or services, but instead, may invite the user to take some sort of action. Examples include political campaign messages, invitations to sign a petition or donate to a cause, invitations to express an opinion or to rank a website, opportunities to forward, link and/or email a particular item from the website, offers to receive a newsletter, or to become a registered user of a website, etc.

Revenue can be generated for the publisher of a web page through multiple revenue models. Some models are based on the user affirmatively selecting (clicking) a particular ad, so that the publisher receives some amount of revenue each time an ad is selected. Metrics such as cost-per-click (CPC) and click-through-rate (CTR) can provide a measure of the extent to which ads are clicked.

Another commonly employed model is based on display advertising, so that the publisher receives revenue in relation to the number of users who have viewed a particular ad. Metrics such as cost-per-impression (CPI) and cost-per-Mille (CPM, e.g., cost/1000 views) can be used to indicate an extent to which ads have been viewed.

Web page designers often optimize the placement of ads in an effort to maximize revenue to the publisher. Ads are located in ad slots, which are regions on the web display into which an ad may be inserted. For each ad, slot, an automated ad auction may take place using contextual signals to select an appropriate ad.

While operable, one limitation with this approach is the fact that the locations of the ad slots are usually predetermined and remain static for each user. It follows that every user, regardless of ad targeting, will be served ads in the same fixed locations on a given page.

Accordingly, various embodiments disclosed herein are generally directed to a method and apparatus for providing dynamic web page layout optimization. As explained below, at least some embodiments generally operate to define a number of different layouts for a web page of a publisher. Each layout has at least one common element, such as an image, text article, etc., and at least one content slot adapted to display a specifically selected content item, such as but not limited to an advertisement.

When a user of a network accessible device requests the display of the web page, a selected layout for the page is identified in response to profile information associated with the device. An appropriate content item (e.g., an ad) is selected for display in each slot in the selected layout. Data are thereafter transferred to the device so that the requested web page is arranged in accordance with the selected layout along with the selected content item(s).

In this way, both the selected content items and the layout of the web page itself can be tailored for different users. In some cases, a more aggressive format may be provided so that more content items are displayed in more prominent locations, whereas in other cases a less aggressive format may be provided that displays fewer content items in less prominent locations. The selection of the layout of the web page and the displayed content items can be carried out by one or more servers including but not limited to a front-end ad server and a back-end layout server.

These and other features and benefits can be understood beginning with a review of FIG. 1 which depicts a network-based, dynamic content transfer system 100 constructed and operated in accordance with various embodiments. In the following example, it will be contemplated that the content items that may be displayed by the system 100 will include advertisements (ads), although such is merely for purposes of illustration and not limiting.

The system incorporates a number of active elements including a publisher server 102, an advertisement (ad) server 104, a layout server 106, and a number N of user devices 108, all of which communicate over one or more networks 109.

The publisher server 102 may represent a web page hosting server or similar system adapted to display one or more web pages from a website of a publisher (e.g., source of the website). The ad server 104 services ad requests to display ads in conjunction with the web pages. The layout server 106 services format requests to identify an appropriate layout for a given web page. While the respective publisher, ad and layout servers 102, 104 and 106, are shown as separate modules, it will be appreciated that these functions can be readily combined; for example, the layout server operation can be incorporated into the ad server, etc.

The user devices 108 represent individual network accessible devices, such as desktop computers, laptop computers, smart phones, tablets, gaming consoles, televisions, and similar devices adapted to interact with the publisher, ad and layout servers 102, 104 and 106.

The network 109 can take any suitable form(s) such as a wide area network (WAN), a local area network (LAN), a broadband wireless network, etc. It will be appreciated that other elements may be incorporated into the system 100, as desired.

Figure 2:
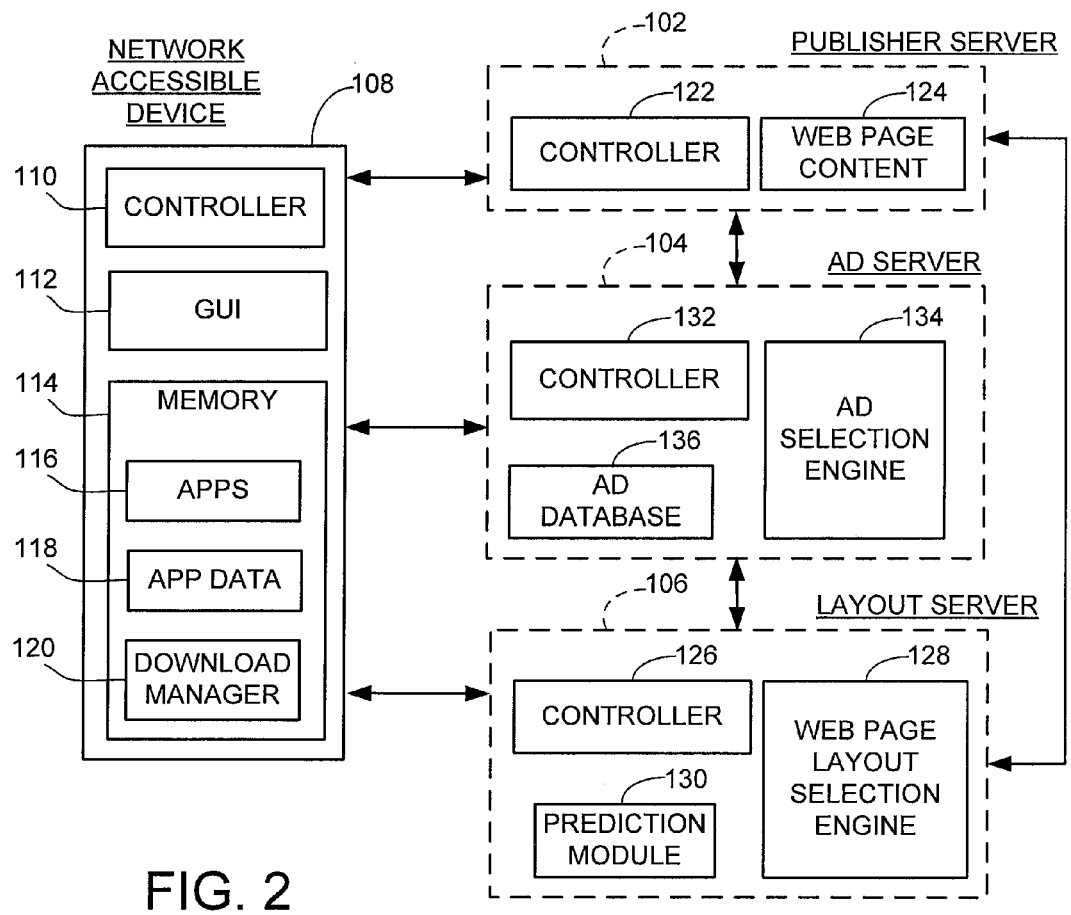
FIG. 2 shows aspects of the system of FIG. 1 in accordance with some embodiments.

FIG. 2 shows aspects of the system 100 of FIG. 1 in accordance with some embodiments. A selected network accessible (user) device 108 from FIG. 1 is contemplated as comprising a desktop computer (personal computer, PC) with a high speed Internet connection to communicate with the network 109. This is merely for purposes of providing a concrete example and is not limiting.

The user device 108 includes a controller 110, a graphical user interface (GUI) 112 and memory 114. The controller 110 may be a programmable processor that uses associated operating system programming and application software (e.g., a web browser) in the memory to interact with the network 109. The GUI 112 may include a display monitor, keyboard, mouse, etc. The memory 114 may represent a hierarchical memory structure made up of various memory devices within the user device 108, including such elements as a non-volatile main memory (e.g., disc memory, solid-state drive, etc.), data transfer buffer, local processor (L1-L3) cache, etc. The memory 114 stores various operational modules including applications (apps) 116, application (app) data 118, and a download manager 120.

Various ways in which web page data can be transferred for display on the GUI 112 will be discussed in greater detail below. At this point, it will be understood that the user of the device 108 opens the web browser application and requests a selected web page from the publisher. A controller 122 of the publisher server 102 processes the request in conjunction with the layout server 106 to deliver content for the selected web page from a web page content store 124.

The layout server 106 includes a controller 126, a web page layout selection engine 128 and a prediction module 130. The layout selection engine 128 generally operates to identify a selected web page layout from a plurality of potential layouts for the web page. The prediction module 130 can generate models for an objective function of the website (e.g., increased revenue) in order to assess predicted user behavior, and this model can be used as part of the layout selection process.

The selected web page may include one or more ad slots, which are serviced under the direction of a controller 132 of the ad server 104 in conjunction with an ad selection engine 134 and an ad database 136. It is contemplated that a variety of web page layouts are available for display on the device, and the respective servers 102, 104 cooperate to select the appropriate layout. The actual mechanism which ultimately selects the page layout for the user device 108 may reside in the ad server 104, in the publisher server 102, or in a combination of both servers.

Figure 3A:
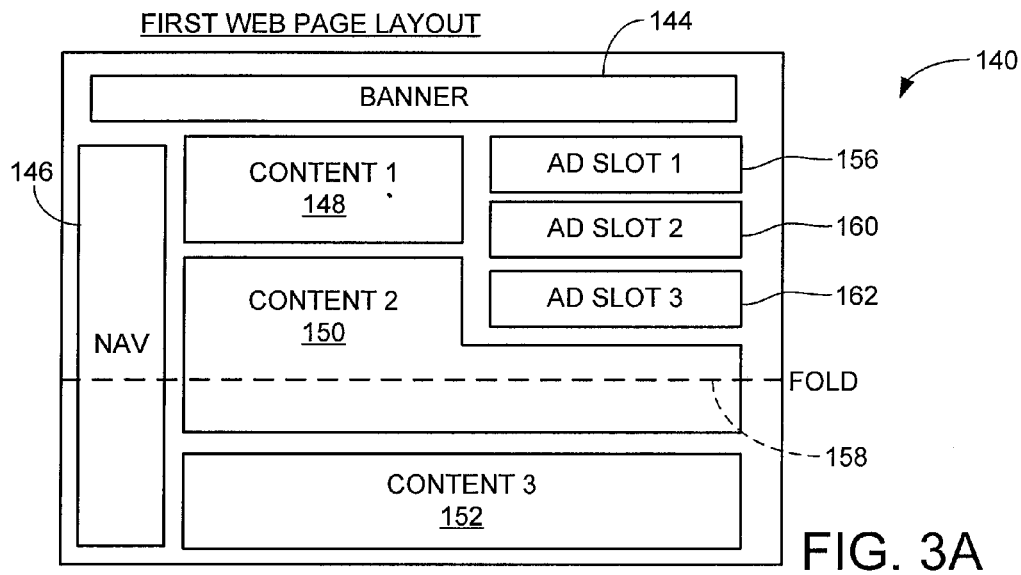
FIGS. 3A-3B represent different example web page layouts that may be displayed on the user device in FIG. 2.
Figure 3B:
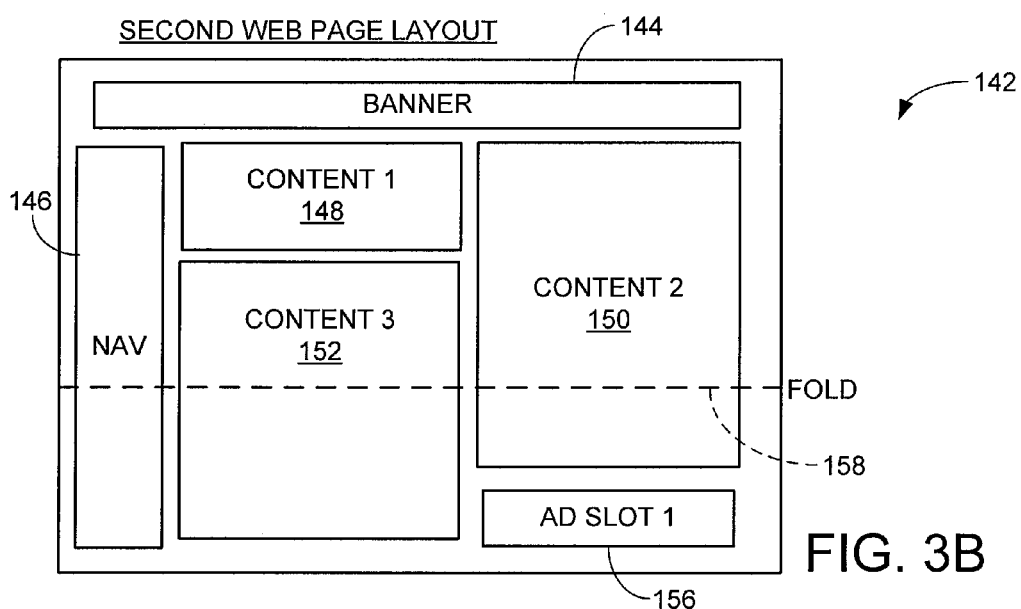

FIGS. 3A-3B illustrate two alternative layouts for the web page requested in FIG. 2. FIG. 3A shows a first layout 140, and FIG. 3B shows a second layout 142. The first layout 140 may be characterized as having a relatively more aggressive format, and the second layout 142 may be characterized as having a relatively less aggressive format.

Both layouts 140, 142 include a number of common elements (objects), including a banner slot 144, a navigation (nav) bar 146, and three content areas 148, 150 and 152 (respectively identified as "Content 1" through "Content 3"). It is contemplated, albeit not required, that the banner provides heading information for the web page (e.g., name of the website, identification of the publisher, etc.), the navigation bar provides links to allow navigation within the page, to other pages, and/or to other websites; and the content areas provide publisher content (e.g., images, video links, text, etc.).

Both layouts 140, 142 further include a common ad slot 156 ("Ad Slot 1"). The respective locations of the ad slot are different; the ad slot 156 in FIG. 3A is above fold line 158, whereas the ad slot 156 in FIG. 3B is below the fold line 158.

It will be appreciated that the fold line 158 nominally represents the lowest visible portion of the web page upon delivery to the GUI when displayed in full-screen mode; portions of the web page below the fold line 158 are not visible until the viewer scrolls down the page.

The more aggressive layout 140 in FIG. 3A further has two additional ad slots 160, 162 ("Ad Slot 2" and "Ad Slot 3") which are also above the fold line 158. It will be noted that the respective layouts 140, 142 have different total numbers of ads, as well as different locations for the ads and different locations for the content. Other layout variations are readily contemplated, including a sequence that provides three or more possible layouts for the web page.

Figure 4:
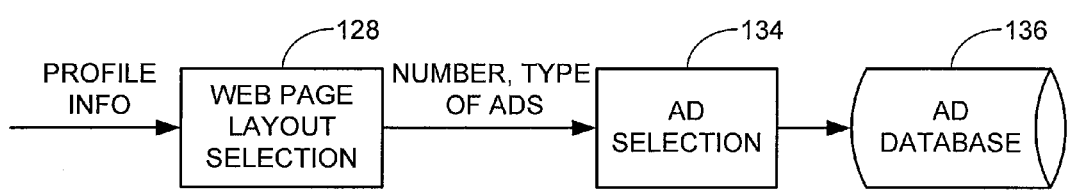
FIG. 4 is a simplified functional block representation of web page layout and ad selection operations carried out in accordance with some embodiments.

FIG. 4 provides a simplified functional block diagram of operational modules that cooperate to populate a selected web page in accordance with one of the foregoing layouts 140, 142. The web page layout selection engine 128 selects an appropriate layout responsive to profile information associated with the device. This profile information can take a variety of forms.

In some embodiments, an opt in/opt out feature is incorporated into the system so that, responsive to an expressed desire on the part of a user, profile information is accumulated and stored by the publisher as a result of previous dealings of the user with the publisher site. For example, if the user is a registered user of the publisher's website, certain non-personally identifiable information, such as gender, age, interests, etc., may be voluntarily supplied by the user at the time of the registration and forwarded for use in selecting the appropriate web page layout. Other profile information may include information supplied by the device, and/or supplied by the ad server, such as previous links visited by the user prior to requesting the current web page, cookies previously stored on the device, purchase history information associated with the device, etc. Data anonymity is provided for security and privacy reasons.

Once the associated layout is selected, data such as the number of ad slots to be serviced and the types of ads suitable for such slots are used by the ad selection engine 134 to select an appropriate ad for each indicated slot from the ad database 136.

Figure 5:
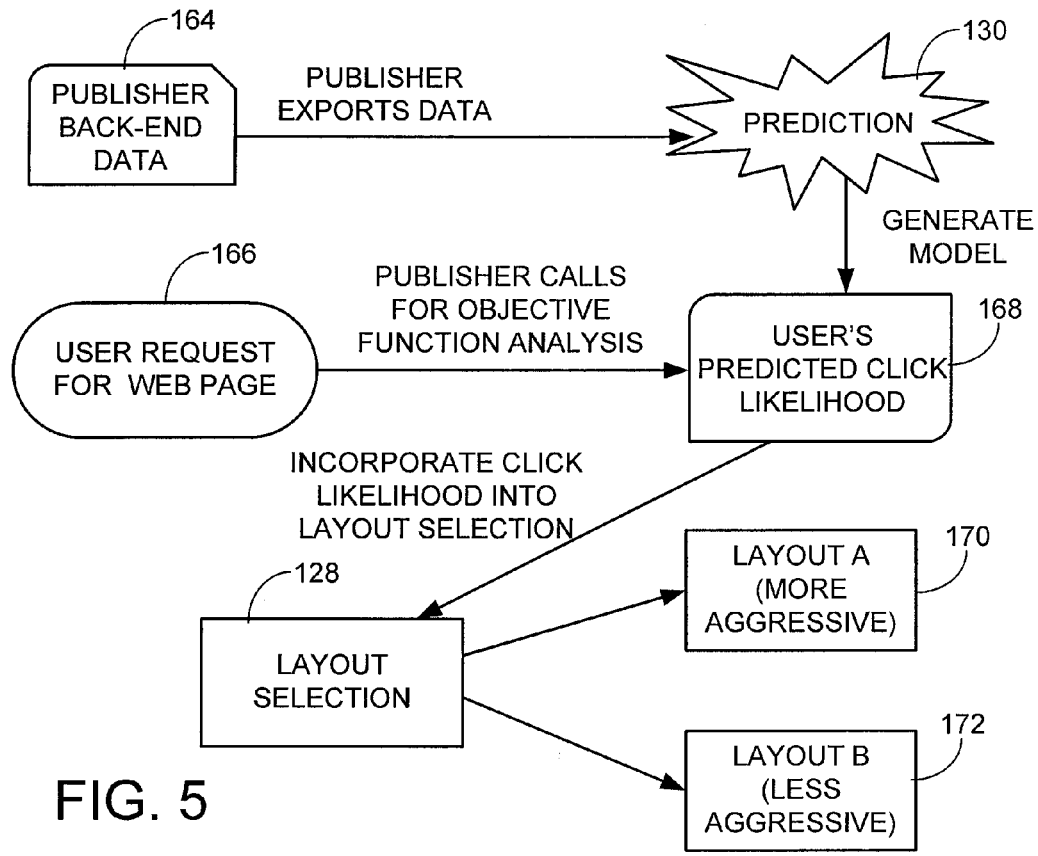
FIG. 5 is a schematic depiction of steps carried out by the system of FIG. 4.

FIG. 5 provides a more detailed sequence over that presented in FIG. 4 in accordance with some embodiments. A predictive model can be generated to arrive at a predicted parameter associated with the overall objective of the website. The objective can take a variety of forms, and can be based on different objectives for different users. For example, one possible objective may be for sales to users that have previously made purchases, but impressions for new users who have not made previous purchases.

Another possible objective could be maximizing revenue for the website, in which case the predicted parameter might be the user's predicted likelihood of clicking on an ad in the web page. Other objectives for the website can be defined, however, such as increasing user time on site, user return rate, purchase rate, response rate, sign-up rate, etc. Suitable parameters can be generated for these and other types of objectives.

Publisher back-end data, represented by block 164, can be exported to the layout server 102 for use by the prediction module 130 to generate a model of user behavior based on different input variables. Thereafter, responsive to a user request for a web page of the publisher, indicated at block 166, the publisher requests an objective function analysis to arrive at the predicted parameter, in this case, the user's click likelihood, block 168. The resulting prediction value may be based on profile information associated with the user stored on the publisher server 102 or elsewhere in the system.

The prediction module 130 may employ empirical and heuristic methods to arrive at the model used to predict the user's likelihood of clicking on a presented ad. The actual prediction value may be a numerical probability or some other suitable value. The prediction module 130 may learn over time to provide better modeling based on previous determinations.

The prediction value may be used as a factor by the layout selection engine 128. For example, it can be used as a weighting value in combination with other factors. The selection engine 128 accordingly selects a more aggressive layout 170 (layout A) or a less aggressive layout 172 (layout B). As desired, the prediction value can further be used during ad selection by the ad server 104 (see e.g., FIG. 2) to provide ads for the identified layout 170 or 172.

It will be noted that different revenue models may be provided for the respective ads; if a more aggressive layout is selected, the ad auction may use this as a factor in selecting ads with revenue modeling based on CPC (pay per click). If a less aggressive layout is selected, the ad auction may use this as a factor in selecting ads with CPM revenue modeling (pay per view).

The actual exchanges of data between the respective user device and servers in order to populate and display a given website can take a variety of forms. In some embodiments, the ad server is a front-end server and the layout server is a back-end server. The layout server may communicate directly with the ad server, or indirectly such as through metatags or other data inserted into the layout. For example, the inserted data may instruct the user device, when requesting an ad, to also send additional data to the ad server or the publisher server. In other embodiments, the ad server, publisher server and the layout server each communicate directly with the end user. Accordingly, the following are some, but not all of the possible communication sequences that may be realized in different configurations.

Figure 6:
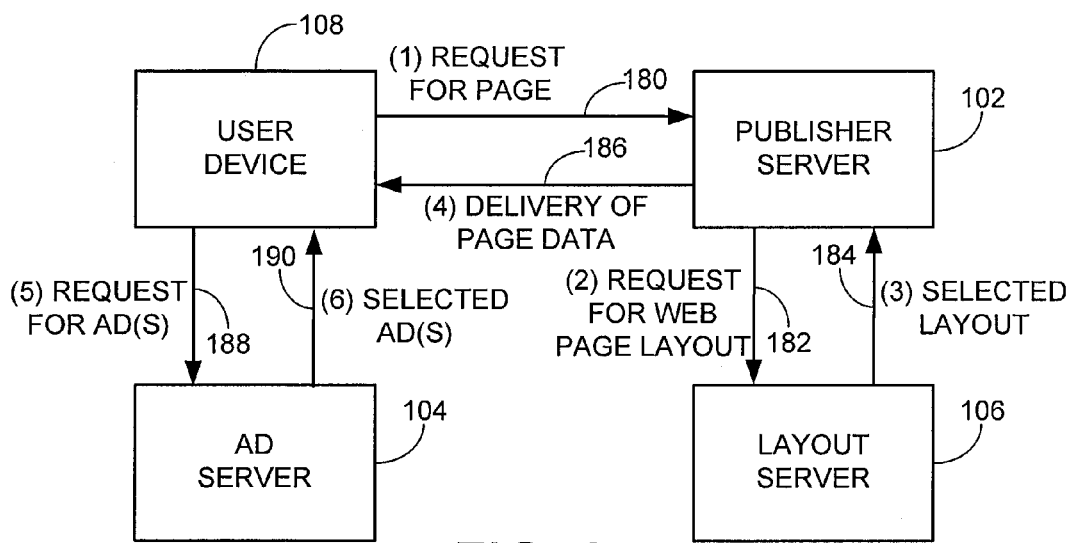
FIG. 6 illustrates a data exchange sequence in which a requested web page with a selected layout is delivered to the user device.

FIG. 6 shows a first sequence in which the user device 108 issues a request for a selected web page via path 180. In response, the publisher server 102 issues a request for an appropriate layout for the web page at path 182. The layout server 106 operates as discussed above to identify a selected layout, path 184. The publisher server 102 proceeds to forward the web page in the selected layout to the user device 108, path 186.

Upon receipt of the delivered web page, a script or other functional aspect of the page directs a request to the ad server 104 for one or more ads, path 188. The selected ad(s) are thereafter returned to the user device 106 by the ad server via path 190. Although not shown in FIG. 6, the selected layout or other information (e.g., the prediction value, etc.) can be communicated to the ad server 104 by the layout server 106, the publisher server 102, or the user device 108.

In some embodiments, the layout server 106 identifies the selected layout by providing a simple indicator with a first value to identify a first layout, a second value to identify a second layout, etc. The layout server 106 may simply provide an indication of whether a relatively more aggressive or less aggressive web page layout should be provided, so it is not necessarily required in FIG. 6 that the layout server 106 have access to the respective versions of the web page. As desired, other data exchanges can take place during the determination; for example, the publisher can forward profile information to the ad server in order to assist in the selection of the appropriate ads, etc.

The format of the delivered page data from the publisher to the device will depend on a variety of factors. If HTML or other markup language is employed, appropriate scripts and objects (elements) will be transferred, thereby enabling the user side web browser to arrange and display the web page as directed.

The sequence of FIG. 6 is relatively straightforward, with minimal requirements on the layout/ad server side to process and evaluate web page layout data. It is not necessary for the layout server to know how many different layouts may be available by the publisher. The server may be configured to simply report a predicted click likelihood score (such as from 0-100, from less to more aggressive), enabling the publisher to decide which format to send, based on the likelihood score. However, the scheme of FIG. 6 may, in some cases, delay the loading of the web page pending the determination by the layout server of which format to employ. This can be partially alleviated by forwarding those elements that are common to all layouts for initial display, and following up with the remaining elements once the selected layout has been identified to the publisher.

Figure 7:
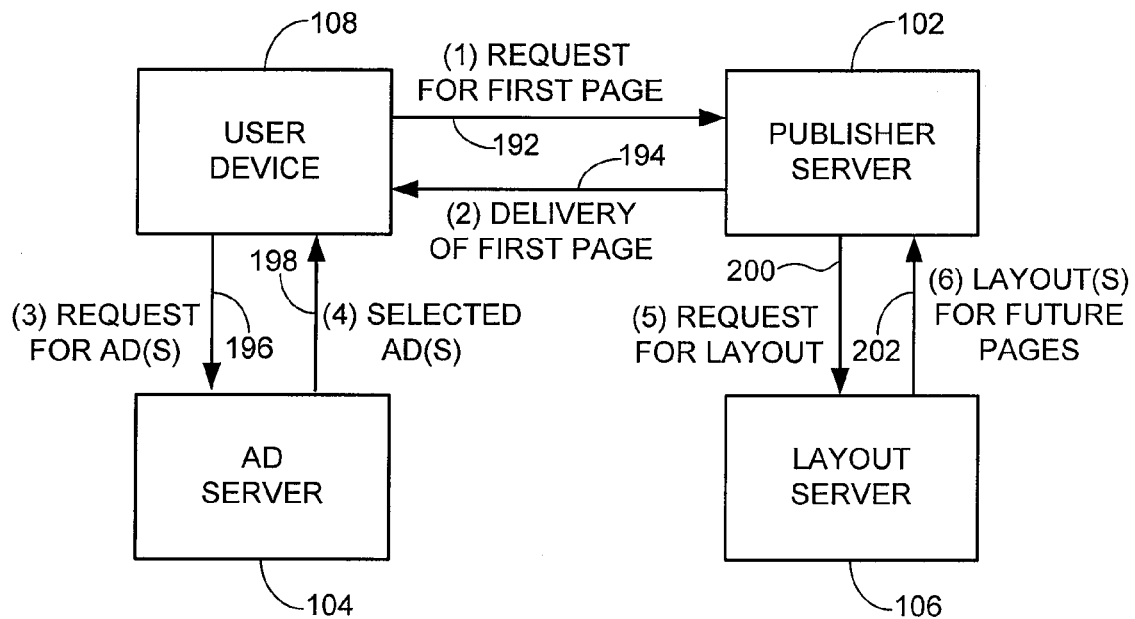
FIG. 7 shows another data exchange sequence in which a requested web page with a selected layout is delivered to the user device.

FIG. 7 shows an alternative sequence to that set forth by FIG. 6. In FIG. 7, the user device issues a request for the first page of a website as before, as indicated at path 192. In response, the publisher server 102 immediately delivers the page data for the first page, path 194, and this triggers a request from the user device 108 to the ad server 104 for one or more ads, path 196, to be displayed in the loading page. The ad requests are serviced by the ad server 104 and the selected ad(s) are forwarded to the device 108, path 198.

In addition, the publisher server 102 forwards a request for layout to the layout server 106, via path 200. The layout server 106 operates as discussed above to suggest a layout for future web pages selected by the user during the user session, as indicated by return path 202. This may be scored as discussed above (e.g., a more aggressive or less aggressive value; a metric scaled from 0-100 or other suitable range, etc.).

In this scheme, the first web page of the publisher's website is the same for all users, but subsequent pages visited by the user, as the user navigates within the site, will be tailored by the publisher in accordance with the feedback information supplied by the ad server 104. An advantage of this approach is that a relatively less aggressive first page experience can be supplied, and more aggressive layouts can be presented the longer the user remains on the site. As the user drills down through the publisher's website, the user may be more inclined to make purchases based on the more specific content being delivered.

For example, if the publisher's website is a sports-related website, the top page may present the user with the opportunity to select any number of different types of professional and/or amateur sports. As the user drills down (e.g., selects "college football," etc.), the user may visit a particular team page within the website. As the user may be a fan of this team, increasingly more aggressive marketing to the user for team-related goods or services on such latter pages may meet with a relatively high level of success. The user's past history of visiting various subpages and/or clicking on such ads during previous visits can further help determine whether CTR or CPM based ads would be more appropriate, and the type of layout that should be presented.

In addition to the flow shown in FIG. 7, based on an opt in/opt out module that operates responsive to user preference, a cookie or other control data can be generated, such as by the layout server 106 or the publisher server 102, and placed on the user device 108 (such as, for example, in the app data store 118, FIG. 1). Such cookies may be further anonymized for security and privacy reasons. In this way, when the user initiates a new user session with the website in the future, the cookie information can be forwarded to the publisher, along with a request for the first page of the website. The publisher can tailor the first page to an aggressiveness level suitable for the user based on the previous recommended layout for that user by the layout server 106. The cookie may persist on the user device for future user sessions.

Figure 8:
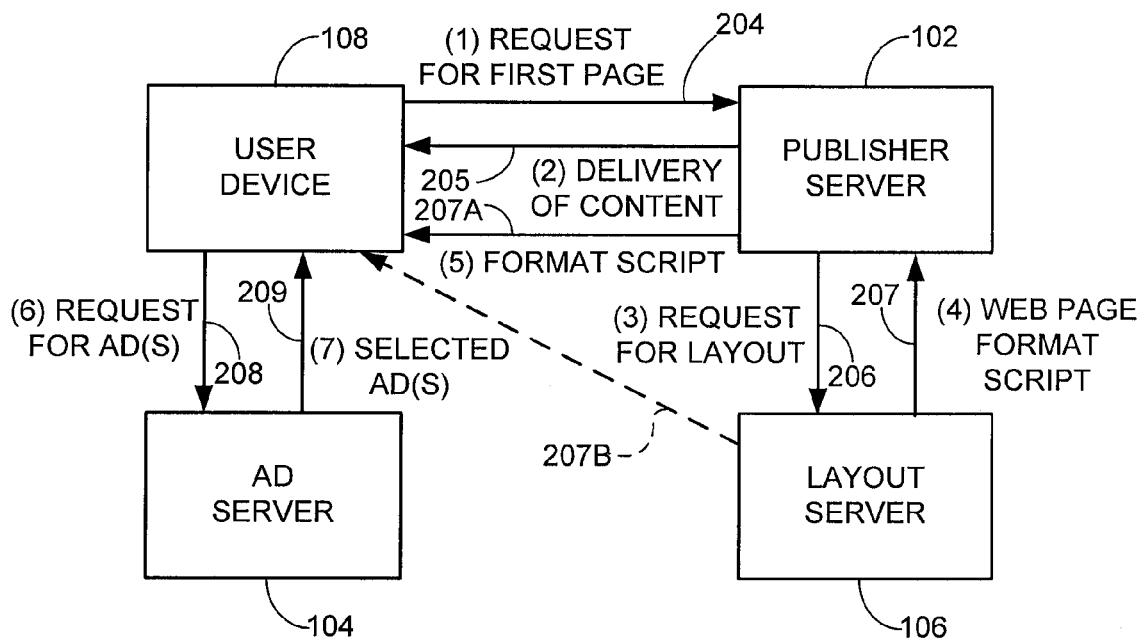
FIG. 8 provides yet another data exchange sequence in which a requested web page with a selected layout is delivered to the user device.

FIG. 8 illustrates yet another alternative data exchange sequence in accordance with some embodiments. As before, the user device 108 issues a request for the first page of a website from the publisher server 102, as indicated by path 204. The publisher server 102 proceeds to deliver content elements to the user device 108, path 205, and issues a request to the layout server 106 for a suitable web page layout, path 206.

The layout server 106 operates as discussed above to identify an appropriate layout for the requested web page and delivers, via path 207, display data (such as a higher level shell script) to enable the user device 108 to arrange and format the web page on the user display in accordance with the selected layout. In FIG. 8, the format script is transferred from the back-end layout server 106 to the publisher server 102 (path 207), and the publisher server 102 forwards the script to the user device 108 (path 207A). In an alternative embodiment, the web page format script may be forwarded directly from the layout server 106 to the user device 108 (path 207B). Once loaded, the user device 108 issues a request to the ad server 104 for one or more ads, path 208, and these are returned via path 209.

In a simple implementation, the layout server 106 maintains, or otherwise accesses and transmits, the appropriate HTML or other markup language to the user device 108 (directly or indirectly) for the selected web page layout. In a more complex implementation, some page data instructions are supplied by the publisher server 102 and other instructions, such as a higher level shell script, are supplied by the layout server 106. As desired, calls may be made to the publisher for additional content required by the identified layout. In some cases, the publisher may transmit content that is ultimately not displayed depending on the selected layout.

Figure 9A:
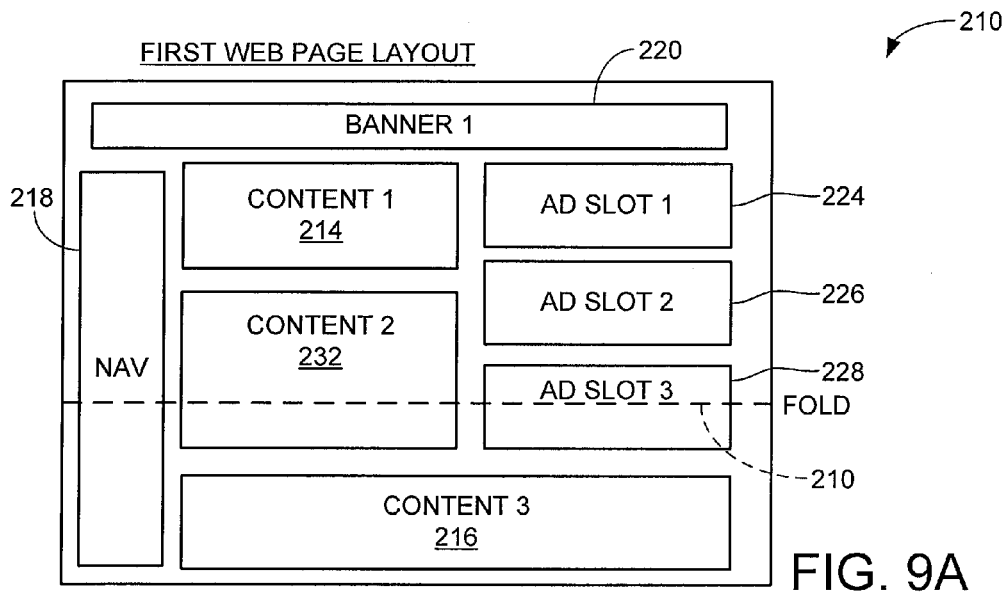
FIGS. 9A-9B represent different example web page layouts that may be displayed on the user device of FIG. 8.
Figure 9B:
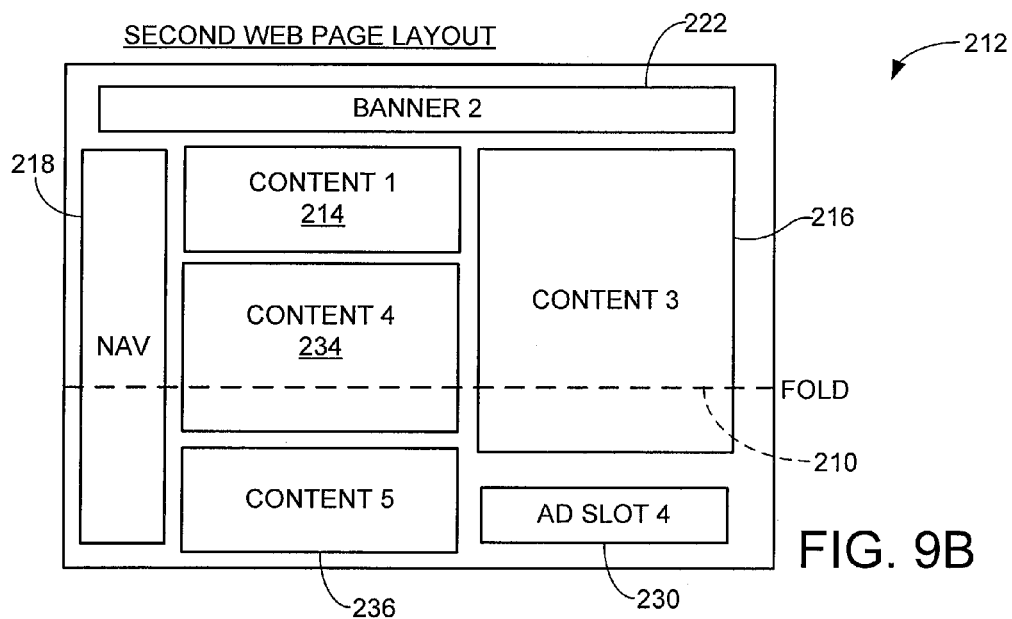

FIGS. 9A-9B provide example web page layouts for a particular web page serviced by the system of FIG. 8. As before, the formats shown in these figures are merely for purposes of illustration and are not limiting. A more aggressive first layout 210 is set forth in FIG. 9A, and a less aggressive second layout 212 is set forth in FIG. 9B. The first and second layouts 210, 212 share some common elements (objects), including content elements 214 and 216 ("Content 1" and "Content 3"), and a common navigation bar 218.

The respective layouts 210, 212 have different banners 220, 222 ("Banner 1" and "Banner 2"), different ad slots 224, 226, 228 and 230 ("Ad Slot 1" through "Ad Slot 4"), and different content areas 232, 234 and 236 ("Content 2," "Content 4," and "Content 5"). Additional variations are contemplated, including different background colors, different fonts, etc.

It can be seen that the total number of content elements, and the arrangement thereof, vary between FIGS. 9A-9B, as do the respective sizes and locations of the ad slots. In some embodiments, the publisher server 102 in FIG. 8 can operate to transmit the data (e.g., images, text, etc.) for all of the Content 1-5 areas 214, 216, 232, 234 and 236, so that all of these data are accumulated in local memory in the device 108. Only those elements identified by the shell script from the ad server 104, however, ultimately get displayed on the device GUI 112 in the locations identified by the script. The system of FIG. 8 thus requires relatively greater complexity, but provides a greater level of dynamic response as well.

As noted above, data relating to previous purchases (or other ad click history of the user) from a particular device may be stored in the ad server 104 (FIG. 8). Profile information, such as demographic and indicated user interest data, may be stored on the publisher server 102. These and other respective types of profile information relating to the device can be combined to assist in web page layout and ad selection for the respective formats of FIGS. 9A-9B.

By way of illustration, assume the ad server level data for a particular device indicates that the device has a recent history of clicking on sporting goods ads. Further assume the publisher level data for the device reveals certain demographic data (e.g., male 25-34, etc.) and/or interests (e.g., "bass fishing," etc.) provided to the publisher by a user of the device.

These and other profile information data points may be used to select an aggressive layout for the web page with ads and content specifically directed to the user. Click-based (CPC) ads for fishing-related gear may be selected for display in the various ad slots. With regard to the publisher content, a number of "standard" content articles may be displayed on the web page (e.g., "Content 1" and "Content 3" in FIG. 9A), but there might also be a special interest slot (e.g., "Content 2" in FIG. 9A) reserved for content suitable for that particular user.

In this case, the publisher server may arrange a number of recent special interest content elements into an available pool, and one of these can be selected if the profile information indicates a suitable match with the profile information. This may result in an article on bass fishing being supplied in the special interest slot (e.g., Content 2" in FIG. 9A). If no match is identified, a "default" content element can be placed into that slot. In yet further embodiments, background wall paper, banner, or other formatting relating to the user (e.g., a bass fishing "theme") may be displayed based on the profile information.

Figure 10:
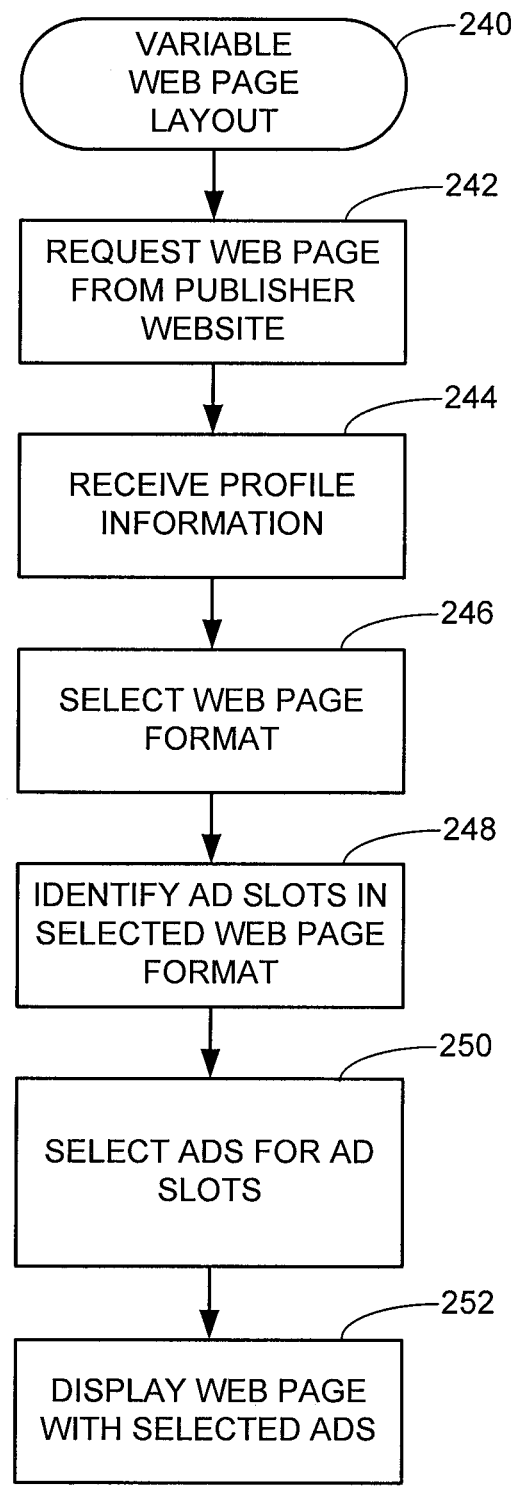
FIG. 10 is a flow chart for a routine that summarizes steps that may be carried out in accordance with various embodiments.

FIG. 10 provides a flow chart for a VARIABLE WEB PAGE LAYOUT routine 240, generally illustrative of steps that may be carried out in accordance with the foregoing examples. A request for a web page from a publisher website is issued at step 242. As discussed above, this can be carried out by the user of the device 108 opening a web browser or other application and issuing an appropriate URL or other data exchange operation. Profile information associated with the request is obtained at step 244. The profile information may take any number of forms, including but not limited to demographic or history information associated with the device that the user has either volunteered, or the system has accumulated in such a way as to be non-personally identifiable information.

A selected web page layout is next identified at step 246, and the number of variable content element slots (e.g., ad slots) in the selected page layout is determined at step 248. While it is contemplated that different page layouts will have different total numbers of slots, in an alternative embodiment, each possible layout has the same overall number of slots, but the slots are physically located in different places on the display (e.g., above or below the fold, etc.). The slots may be the same size (e.g., 320×50 pixels, etc.) or may be different sizes (e.g., 640×100 pixels, 200×400 pixels, etc.).

Suitable ads are next selected at step 250, with at least one ad per slot depending on the configuration. Both the selected layout and the associated ads are displayed on the user device at step 252.

The various embodiments as disclosed herein can provide benefits such as improved user enjoyment and dwell time on a publisher site, as well as more effective revenue realization by the publisher. Optimizing ad targeting at the page view level, rather than at the ad slot level, allows for improvements based on variable types of ads, variable numbers of ads, variable positions of ads and/or variable arrangements of ads and content.

These and other layout decisions can be formed in a variety of ways. In some embodiments, the publisher predefines (at least) two versions of each web page and the API module determines which is the better layout for a given user. In other embodiments, the API can help determine an on-the-fly layout of various existing content elements supplied by the publisher (or the ad server) to obtain an optimum layout.

The prediction module can accept any number of additional dependent variables, such as operating system, browser type, day of the week, time of day, etc., in addition to the profile information to arrive at the likelihood of user selection of one or more of the ads. Well known feedback and AI learning techniques can be used to improve the prediction model over time.

For users with relatively low click likelihoods, a less aggressive ad implementation can be supplied with fewer ads and/or ads in less prominent locations, such as below the fold, etc. Similarly, users with relatively high click likelihoods can result in relatively more aggressive ad implementations with more ads in more prominent locations, such as above the fold, etc. Revenue modeling (e.g., click-based ads v. page view ads) can be selected as well based on the likelihood of user clicking value.

It will be appreciated that revenue generation may not be the main objective of the web page layout optimization; as noted above, other objectives may be established by the publisher such as increasing user time on site, user return rate, user sign-up rate, user recommendation rate, and so on. Accordingly, for purposes herein, the terms advertisement and ad will be understood broadly as a communication displayed in a web page layout that provides an invitation to the user to take a selected action.

While various embodiments discussed herein have been in the context of a desktop PC running an Internet web browser, it will be appreciated that such is merely for purposes of providing a concrete illustration and is not limiting. Any number of different types and styles of devices can be used. For example, the ads can be provided in the context of non-web browser applications so that the format and layout of the publisher supplied content are altered as set forth herein.

In some embodiments, the subject matter may be incorporated in the form of computer-readable storage media including, but not limited to, an electronic, optical, magnetic, or other storage or transmission device capable of providing a processor with computer-readable instructions. Examples of suitable media include, but are not limited to, a floppy disk, CD-ROM, DVD, magnetic disk, memory chip, ROM, RAM, an ASIC, hard disk drive (HDD), solid-state drive (SSD), flash memory, a configured processor, optical media, magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise programming code from any suitable computer-programming language, including but not limited to, for example, C, C++, C#, Visual Basic, Java, Python, Perl, and JavaScript. It will be appreciated that a computer readable storage medium, as used herein, does not include a transitory signal.

While the variable content items have been illustrated herein as constituting advertisements for display in ad slots, such is merely for purposes of illustration and is not limiting. Other formats for the variable content items are contemplated, including web page layouts that omit any and all advertising. In such case, a variable element content server can be used to select appropriate content elements for the associated variable content element slots in the various web page layouts. The variable element content server may operate in a fashion similar to the ad server discussed herein to select an appropriate content element from a pool of available content elements.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A computer-implemented method comprising:
    defining a first layout for a first web page of a website, the first layout including a primary content element and one content slot;
    defining a second layout for a second webpage of the website, the second layout including the primary content element and a plurality of content slots;
    receiving a first request, during a user session, for a first web page of the website from a network accessible device, the first web page corresponding to a first level of the website, the first request including user profile information;
    determining, responsive to receiving the first request, a first predicted click likelihood for the network accessible device based on the user profile information;
    determining that the first predicted click likelihood is below a first threshold corresponding to cost per mille (CPM)-designation;
    selecting the first layout, the one content slot of the first layout assigned for display of a CPM-designated content item selected using a first objective function based on impressions, responsive to determining that the first predicted click likelihood is below the first threshold;
    transferring first data to the network accessible device to display the first web page including the first layout;
    receiving a second request, after the first request, during the user session, for a second page of the website via a link to a subpage on the web site, the second request including the user profile information;
    determining, responsive to receiving the second request, a second predicted click likelihood for the network accessible device based on the user profile information;
    determining that the second predicted likelihood is above a second threshold corresponding to cost per click (CPC)-designation;
    selecting the second layout, the plurality of content slots assigned for display of a corresponding plurality of CPC-designated content items selected using a second objective function based on clicks, responsive to determining that the second predicted likelihood is above the second threshold; and
    transferring second data to the network accessible device to display the second web page including the second layout and the plurality of content items.

2. The method of claim 1, in which the at least one content item is an advertisement (ad) and the content slot is an ad slot.

3. The method of claim 1, in which a server transfers the first and second layouts for the web page and the at least one content item for the content slot to the network accessible device.

4. The method of claim 1, in which the data includes content not displayed on the web page and a server transfers commands to arrange a common element and the content item on the network accessible device.

5. The method of claim 1, in which the selected at least one content item is identified responsive to a computer executed auction.

6. The method of claim 1, in which the at least one content item and the first web page layout are both selected responsive to a calculated predicted likelihood of the user clicking on the at least content item.

7. The method of claim 1, in which a standard layout of the web page is provided for a first page view of the website, and in which subsequent layouts for subsequent page views of the website are selected responsive to said profile information.

8. A non-transitory computer-readable storage medium which stores associated programming code to:
    define a first layout for a first web page of a website, the first layout including a primary element and one content slot;
    define a second layout for a second webpage of the website, the second layout including the primary content element and a plurality of content slots;
    receive a first request, during a user session, for a first web page of the web site from a network accessible device, the first web page corresponding to a first level of the website, the first request including user profile information;
    determine, responsive to receiving the first request, a first predicted click likelihood for the network accessible device based on the user profile information;
    determine that the first predicted click likelihood is below a first threshold corresponding to cost per mille (CPM)-designation;
    identify the first layout, the one content slot of the first layout assigned for display of a CPM-designated content item selected using a first objective function based on impressions, responsive to determining that the first predicted click likelihood is below the first threshold;
    transfer first data to the network accessible device to display the first web page including the first layout and the one content item;
    receive a second request, after the first request during the user session, for a second page of the website via a link to a subpage on the web site, the second request including the user profile information;
    determine, responsive to receiving the second request, a second predicted click likelihood for the network accessible device based on the user profile information;
    determine that the second predicted likelihood is above a second threshold corresponding to cost per click (CPC)-designation;
    select the second layout, the plurality of content slots assigned for display of a corresponding plurality of CPC-designated content items selected using a second objective function based on clicks, responsive to determining that the second predicted likelihood is above the second threshold; and transfer second data to the network accessible device to display the second web page including the second layout and the plurality of content items.

9. The computer-readable storage medium of claim 8, in which the content item is an advertisement (ad) and the content slot is an ad slot.

10. The computer-readable storage medium of claim 8, in which a server transfers the first and second layouts for the web page and the at least one content item for the content slot to the network accessible device.

11. The computer-readable storage medium of claim 8, in which the data includes content not displayed on the web page and a server transfers commands to arrange a common element and the content item on the network accessible device.

12. The computer-readable storage medium of claim 8, in which the selected at least one content item is identified responsive to a computer executed auction.

13. The computer-readable storage medium of claim 8, in which the at least one content item and the first web page layout are both selected responsive to a calculated predicted likelihood of the user clicking on the at least content item.

14. The method of claim 1, further comprising:
selecting at least one content item for display in each of the content slots in the selected second layout; and
transferring data to the network accessible device to display the second web page arranged in accordance with the selected second layout along with the content items selected for the content slots in the selected second layout.

\* \* \* \* \*